(12) United States Patent
Kumagai

(10) Patent No.: US 12,391,131 B2
(45) Date of Patent: Aug. 19, 2025

(54) ELECTRIC TRUCK

(71) Applicant: Daimler Truck AG, Leinfelden-Echterdingen (DE)

(72) Inventor: Naotatsu Kumagai, Kawasaki (JP)

(73) Assignee: Daimler Truck AG, Leinfelden-Echterdingen (DE)

( * ) Notice: Subject to any disclaimer, the term of this patent is extended or adjusted under 35 U.S.C. 154(b) by 297 days.

(21) Appl. No.: 18/254,331

(22) PCT Filed: Sep. 28, 2021

(86) PCT No.: PCT/JP2021/035485
§ 371 (c)(1),
(2) Date: May 24, 2023

(87) PCT Pub. No.: WO2022/113509
PCT Pub. Date: Jun. 2, 2022

(65) Prior Publication Data
US 2024/0010078 A1      Jan. 11, 2024

(30) Foreign Application Priority Data
Nov. 27, 2020   (JP) ................. 2020-196545

(51) Int. Cl.
*B60L 50/64* (2019.01)
*B60L 1/00* (2006.01)
*B60L 50/60* (2019.01)

(52) U.S. Cl.
CPC ............... *B60L 50/64* (2019.02); *B60L 1/00* (2013.01); *B60L 50/66* (2019.02); *B60L 2200/36* (2013.01)

(58) Field of Classification Search
CPC . B60L 50/64; B60L 50/66; B60K 2001/0438; B60K 2001/0444
See application file for complete search history.

(56) References Cited

U.S. PATENT DOCUMENTS 10,493,837 B1 * 12/2019 Angelo ................. B60L 50/66
11,285,820 B2 * 3/2022 Maryanski .......... H01M 50/233
(Continued)

FOREIGN PATENT DOCUMENTS

AU    2019200049 A1   4/2020
BR   102019000180-1 A2   4/2020
(Continued)

OTHER PUBLICATIONS

PCT/JP2021/035485, English-language Written Opinion (PCT/IB/373 and PCT/ISA/237) dated May 30, 2023 (Four (4) pages).
(Continued)

*Primary Examiner* — Brian L Swenson
(74) *Attorney, Agent, or Firm* — Crowell & Moring LLP

(57) ABSTRACT

An electric truck with a plurality of battery packs adjacently arranged along a vehicle length direction, the battery packs each installed under side rails constituting a ladder frame and the battery packs each having a pair of first side faces facing to the vehicle length direction and a pair of second side faces facing to a vehicle width direction. The electric truck has battery-side brackets disposed on both sides in the vehicle length direction of each of the battery pack each having an opposing face facing one of the first side faces and a pair of extending faces respectively extending from an upper edge and a lower edge of the opposing face and respectively overlapping a top face and a bottom face of the battery pack. Among the battery-side brackets, intermediate brackets have a lightening hole on the opposing face thereof and outer brackets do not have any lightening holes.

8 Claims, 7 Drawing Sheets

(56) References Cited

U.S. PATENT DOCUMENTS

| | | | |
|---|---|---|---|
| 11,993,157 B2* | 5/2024 | Prothery | H01M 50/249 |
| 2014/0014428 A1* | 1/2014 | Yanagi | B60K 1/04 |
| | | | 180/68.5 |
| 2015/0349390 A1* | 12/2015 | Aiba | H01M 50/264 |
| | | | 429/90 |
| 2019/0051872 A1* | 2/2019 | Kakimura | H01M 10/0481 |
| 2020/0247224 A1 | 8/2020 | Ito et al. | |
| 2021/0249731 A1* | 8/2021 | You | H01M 50/293 |
| 2022/0388385 A1* | 12/2022 | Okonogi | B62D 21/02 |

FOREIGN PATENT DOCUMENTS

| | | |
|---|---|---|
| CA | 3 028 808 A1 | 4/2020 |
| CN | 110582423 A | 12/2019 |
| CN | 210391305 U | 4/2020 |
| DE | 10 2016 113 759 A1 | 4/2017 |
| EP | 3 584 103 A1 | 12/2019 |
| JP | 6-12149 U | 2/1994 |
| JP | 2009-35126 A | 2/2009 |
| JP | 2016-113063 A | 6/2016 |
| JP | 2019-26050 A | 2/2019 |
| MX | 2019000281 A | 9/2019 |
| WO | WO 2009/016976 A1 | 2/2009 |
| WO | WO 2019/021965 A1 | 1/2019 |

OTHER PUBLICATIONS

English-language Extended European Search Report issued in European Application No. 21897487.1-1009 dated Jun. 13, 2024 (6 pages).
PCT/JP2021/035485, International Search Report dated Dec. 21, 2021 (Two (2) pages).

* cited by examiner

ELECTRIC TRUCK

TECHNICAL FIELD

The present disclosure relates to an electric truck equipped with multiple battery packs.

BACKGROUND ART

Conventionally, from the viewpoint of reducing environmental loads, electric vehicles, such as electric vehicles (EVs) and hybrid vehicles (HEVs), have been developed which travel by supplying a motor with electric power of a battery for driving. In recent years, even in the field of commercial vehicles such as trucks, electric vehicles have been developed (see Patent Document 1 for example). In such electric commercial vehicles, from the viewpoint of reducing cost, it has been considered to apply general-purpose battery packs normally used in passenger cars.

PRIOR ART DOCUMENTS

Patent Literature

[Patent Document 1] Japanese Laid-Open Patent Publication No. 2016-113063

SUMMARY OF INVENTION

Technical Problem

However, since the battery pack for a passenger car is supposed to be mounted inside a vehicle body, there is a problem that a housing of the battery pack itself has a relatively low load bearing strength. Therefore, an electric truck equipped with such a battery pack disposed under a ladder frame requires a high load bearing strength in a support device (bracket) that supports the battery pack.

On the other hand, since electric trucks are usually heavier than passenger cars, electric trucks need to mount thereon multiple battery packs made for passenger cars. Thus, when considering only the requirement of the load bearing strength described above, there is a risk that the total weight of the support device increases, resulting in an increase in weight of the electric truck.

The present disclosure has been devised in view of the above-mentioned problems, and one of the objects of the present disclosure is, in an electric truck, to suppress weight increase while ensuring protectability of the battery packs in the event of collisions.

Solution to Problem

The present disclosure has been made to solve at least a part of the above problems, and can be realized as the following aspects or application examples.

(1) An electric truck according to the present application example is provided with a plurality of battery packs adjacently arranged along a vehicle length direction, the battery packs each being installed under side rails constituting a ladder frame, the battery packs each having: a pair of first side faces facing to the vehicle length direction; and a pair of second side faces facing to a vehicle width direction and being positioned outside in the vehicle width direction of the side rails. The electric truck includes: battery-side brackets disposed on both sides in the vehicle length direction of each of the battery packs, the battery-side brackets each having an opposing face facing one of the first side faces and a pair of extending faces respectively extending from an upper edge and a lower edge of the opposing face and respectively overlapping a top face and a bottom face of the battery pack; and frame-side brackets connecting the battery-side brackets to the side rails, wherein among the battery-side brackets, intermediate brackets adjacent to each other in the vehicle length direction each have at least one lightening hole on the opposing face thereof, and outer brackets disposed at outermost positions in the vehicle length direction do not have any lightening holes.

According to such an electric truck, in the event of a side collision, a side collision load is transmitted from the collision side to the opposite side through the battery-side brackets, so that the side collision load can be absorbed by not only the members on the collision side, but also the members on the side opposite to the collision side. Therefore, the protectability of the battery packs in side collisions can be enhanced.

It should be noted that, in the battery-side brackets, the side collision load is transmitted mainly through corner portions (portions having a relatively high rigidity) between the opposing faces and each one of the extending faces, and namely, central regions in a vehicle height direction of the opposing faces of the battery-side brackets do not contribute much to the transmission of the side collision load. In addition to this, the intermediate brackets adjacent to each other do not easily come into contact with other members even in the event of collisions (front collisions, rear collisions, and side collisions) since the opposing faces thereof are not exposed. Therefore, as compared with the outer brackets of which opposing faces are exposed, the intermediate brackets do not require a high load bearing strength.

In view of this, by providing the lightening holes on the opposing faces of the intermediate brackets among the battery-side brackets, the weight of the intermediate brackets can be reduced while the requirement of the load bearing strength is satisfied and the function of transmitting the side collision load is ensured as described above. In contrast, by not providing any lightening holes on the opposing faces of the outer brackets, the load bearing strength can be ensured in the outer brackets. Hence, it is possible to suppress the weight increase while ensuring the protectability of the battery packs in collisions.

(2) In the electric truck according to the present application example, the outer bracket may have a device mounting unit that mounts an on-board device on the opposing face thereof.

If the outer bracket has the device mounting unit, the on-board device can be mounted on the opposing face thereof, so that mountability of the on-board device can be enhanced. Further, in a front or rear collision of the electric truck, since the impact load is inputted to the on-board device before being input to the outer bracket, the initial input of the impact load can be absorbed by the on-board device before being absorbed by the outer bracket. As a result, the impact load to be transmitted to the battery packs through the outer bracket is reduced, so that the protectability of the battery packs in front or rear collisions can be enhanced.

(3) In the electric truck according to the present application example, the on-board device may be a power distribution device that distributes electric power outputted from the battery packs to a plurality of auxiliary devices.

If the on-board device mounted on the device mounting unit is the power distribution device, it is possible to mount the power distribution device, which is a device associated with the battery packs, on the outer bracket near to the battery packs, so that the routing performance of harness can be enhanced. In addition, since the power distribution device can be moved together (integrally) with the battery-side bracket and the battery pack, mountability and dismountability of the power distribution device can be enhanced.

(4) In the electric truck according to the present application example, the intermediate bracket may have the lightening hole in a central region in a vehicle height direction of the opposing face thereof.

As such, by setting the position of the lightening hole(s) in the central region in the vehicle height direction of the opposing face rather than the corner portions between the opposing face and each of the extending faces in the intermediate bracket, it is possible to prevent a decrease in rigidity of the corner portions between the opposing face and the extending faces. This ensures the function of transmitting the side collision load in the intermediate bracket more appropriately, achieving more reliable assurance of protectability of the battery packs in side collisions.

(5) In the electric truck according to the present application example, two of the intermediate brackets adjacent to each other may be equal to each other in arrangements of the lightening holes.

According to such arrangements of the lightening holes, a common member can be applied as each of the two intermediate brackets, contributing to a cost reduction. Further, since the rigidity becomes equal between the two intermediate brackets adjacent to each other, equalization of the rigidity can be realized.

(6) In the electric truck according to the present application example, two of the intermediate brackets adjacent to each other may be different from each other in arrangements of the lightening holes.

According to such arrangements of the lightening holes, a portion at which the lightening hole is formed in one of the intermediate brackets can be strengthened by a portion at which the lightening hole is not provided in the other one of the intermediate brackets. Thus, when regarding the two intermediate brackets as a unit, the rigidity is more likely to be ensured at any positions in the unit. Further, while ensuring the rigidity in this way, the cut amount of the lightening holes can be increased (the lightening hole can be enlarged in each intermediate bracket), so that a further weight reduction can be achieved in the intermediate brackets.

(7) The electric truck according to the present application example may further include a leaf suspension disposed adjacently in the vehicle length direction to the outer bracket.

In such an electric truck including the leaf suspension, the leaf suspension and the outer bracket may come into contact with each other in the event of a front or rear collision. In regard to this, according to the outer brackets without the lightening holes on the opposing faces thereof as described above, since the load bearing strength is ensured, negative effects on the battery packs can be reduced even in the case where the outer brackets come into contact with the leaf suspension, which is a heavy object. Therefore, it is possible to ensure the protectability of the battery packs in front or rear collisions.

Advantageous Effects

According to the present disclosure, in an electric truck, it is possible to suppress weight increase while ensuring the protectability of the battery packs in the event of collisions.

DESCRIPTION OF EMBODIMENT(S)

Figure 1:
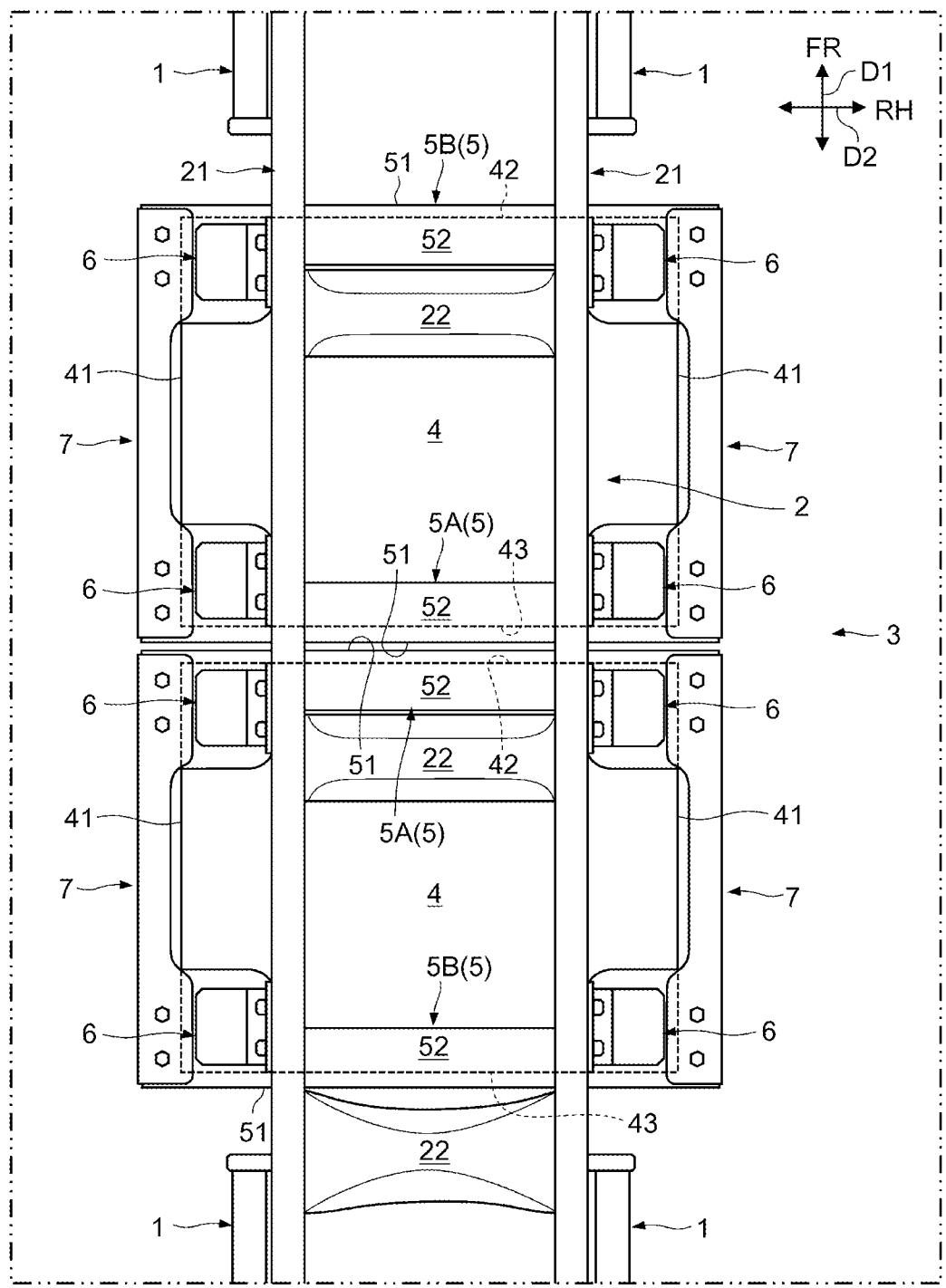
FIG. 1 is a top view of a main part of an electric truck according to an embodiment.

Referring to the drawings, an embodiment of the present disclosure will now be described. The following embodiment is merely illustrative and there is no intention to exclude the application of various modifications and techniques not explicitly described in this embodiment. The configurations of the following embodiment may be variously modified and implemented without departing from the scope thereof. Also, the configurations can be selected or omitted according to the requirement, or can be combined appropriately.

1. Configuration

[1-1. Overall Configuration]

As illustrated in FIG. 1, an electric truck 3 according to the present embodiment is an electric vehicle (EV, HEV) having a ladder frame 2, and travels by supplying a non-illustrated motor with electric power stored in multiple battery packs 4 for driving.

Hereinafter, the front-rear direction of the electric truck 3 is also referred to as a vehicle length direction D1, and the right-left direction of the electric truck 3 is also referred to as a vehicle width direction D2. The up-down direction orthogonal to both the vehicle length direction D1 and the vehicle width direction D2 is also referred to as a vehicle height direction D3. In the drawings, the front side is denoted by "FR", the right side is denoted by "RH", and the upper side is denoted by "UP". Incidentally, FIG. 1 illustrates the lower structure of the electric truck 3 and omits the upper structure (body) disposed on or above the ladder frame 2.

The ladder frame 2 is a member forming a frame of the electric truck 3, and has high rigidity and strength. The ladder frame 2 includes a pair of side rails 21 extending in the vehicle length direction D1, and multiple cross members 22 extending in the vehicle width direction D2 and connecting the side rails 21 to each other.

The pair of side rails 21 are disposed apart from each other in the vehicle width direction D2. Each of the side rails 21 has a channel shape (U-shaped cross section) in which a pair of plate-shaped flange portions extend inward in the vehicle width direction D2 respectively from upper and lower edges of a plate-shaped web portion extending along the vehicle length direction D1 and the vehicle height direction D3.

The cross members 22 are disposed apart from each other in the vehicle length direction D1. Although three cross members 22 are illustrated in FIG. 1, the number of cross members 22 provided in the electric truck 3 is not particularly limited.

Multiple battery packs 4 are provided on the electric truck 3 so as to be adjacent to each other in the vehicle length direction D1. The present embodiment illustrates the electric truck 3 in which two battery packs 4 are arranged along the vehicle length direction D1. The two battery packs 4 are configured so as to be equal to each other.

Each battery pack 4 is, for example, a general-purpose high-voltage battery pack usable in passenger cars. In the electric truck 3, each battery pack 4 is installed under the pair of side rails 21, and protrudes outward in the vehicle width direction D2 further than the side rails 21. Here, each battery pack 4 is exemplified to be in a box shape of which dimension in the vehicle height direction D3 is smaller (thinner) than dimensions in the vehicle length direction D1 and the vehicle width direction D2. However, the shape of the battery packs 4 is not particularly limited.

Each battery pack 4 has a pair of first side faces 42, 43 facing to the vehicle length direction D1 and a pair of second side faces 41 facing to the vehicle width direction D2. Hereinafter, the first side face 42 facing forward is also referred to as a "front face 42" and the first side face 43 facing rearward is also referred to as a "rear face 43".

A pair of second side faces 41 are positioned outside in the vehicle width direction D2 of the pair of side rails 21. More specifically, the second side face 41 on the right side is positioned on the right side of the right side rail 21, and the second side face 41 on the left side is positioned on the left side of the left side rail 21.

Since the second side faces 41 are disposed outside in the vehicle width direction D2 of the side rails 21 as described above, the dimension in the vehicle width direction D2 of each battery pack 4 is secured larger than the distance between the web portions of the side rails 21. Thereby, each battery pack 4 is designed to have an increased capacity.

Hereinafter, of the two battery packs 4, the one disposed on the front side is also referred to as a "front battery pack 4", and the other one disposed on the rear side is also referred to as a "rear battery pack 4".

In the electric truck 3 of the present embodiment, leaf suspensions 1 are disposed in front of the front battery pack 4 and behind (on the rear side of) the rear battery pack 4. The leaf suspensions 1 are heavy elastic members each formed by overlapping plate-shaped spring pieces, and have a function of absorbing vibration to be transmitted from non-illustrated wheels to the side rails 21.

Each of the leaf suspensions 1 disposed in front of the front battery pack 4 is a part of a front suspension and absorbs vibration to be transmitted from the right or left front wheel to the right or left side rail 21. On the other hand, each of the leaf suspensions 1 disposed behind the rear battery pack 4 is a part of a rear suspension and absorbs vibration to be transmitted from the right or left rear wheel to the right or left side rail 21.

The electric truck 3 includes, as a support device for supporting the battery packs 4, battery-side brackets 5 and frame-side brackets 6. The battery-side brackets 5 are outer wall bodies disposed on both (front and rear) sides in the vehicle length direction D1 of each battery pack 4, and have a function of protecting each battery pack 4 from impact loads. On the other hand, the frame-side brackets 6 extend downward and outward in the vehicle width direction D2 from the side rails 21, and have a function of hanging each battery pack 4 from the side rails 21.

The electric truck 3 of the present embodiment is further provided with auxiliary brackets 7 which constitute the above support device together with the battery-side brackets 5 and the frame-side brackets 6. The auxiliary brackets 7 are outer wall bodies disposed on both (right and left) sides in the vehicle width direction D2 of each battery pack 4, and have a function of protecting each battery pack 4 from impact loads. As such, in the present embodiment, the battery-side brackets 5 and the auxiliary brackets 7 are disposed so as to surround four sides of each battery pack 4 to accommodate the battery pack 4.

Figure 2:
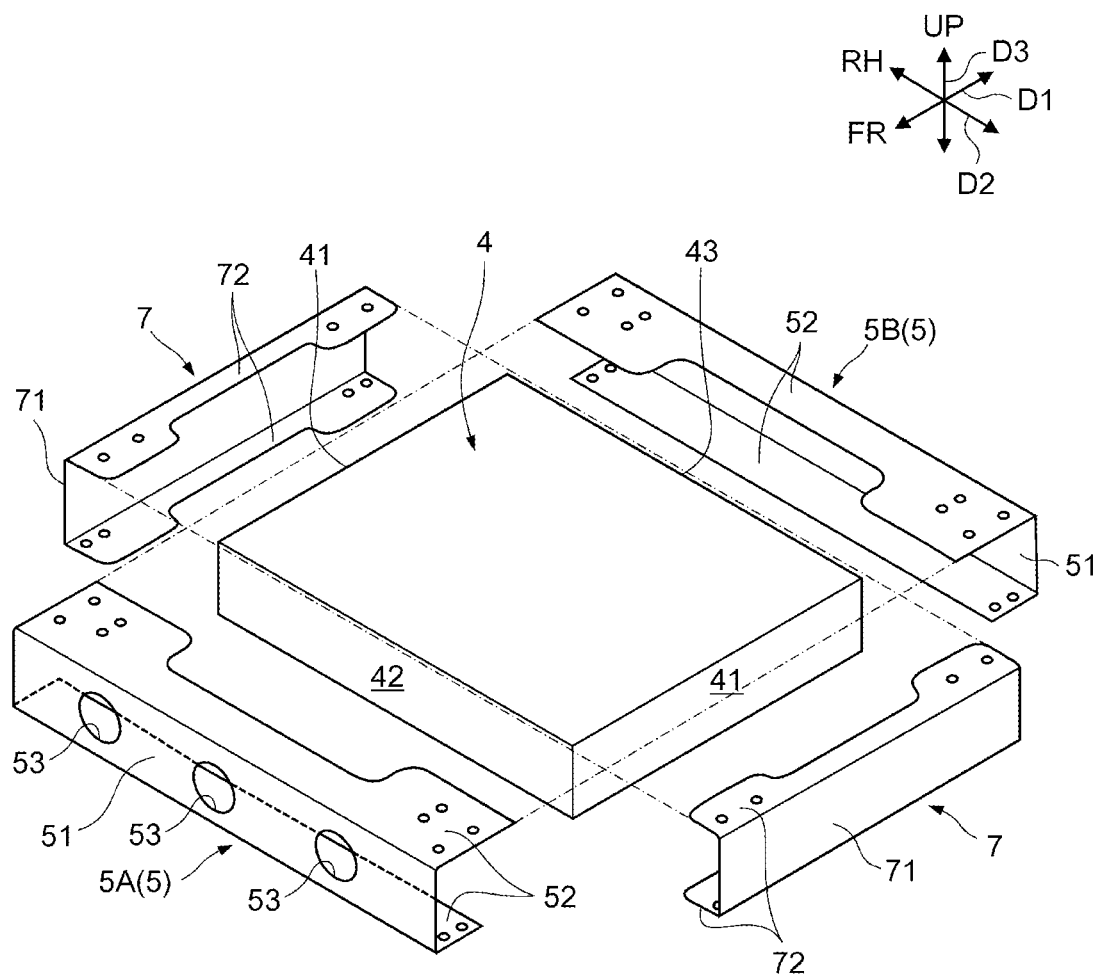
FIG. 2 is an exploded perspective view of a battery pack, battery-side brackets and auxiliary brackets.

Referring now to FIG. 2, the pair of battery-side brackets 5 and the pair of auxiliary brackets 7 provided for one battery pack 4 will be described. In FIG. 2, the rear battery pack 4 is exemplified as the one battery pack 4.

Each of the battery-side brackets 5 and the auxiliary brackets 7 is formed of a steel plate(s) and forms a channel shape (U-shaped cross section). The pair of battery-side brackets are formed similarly (front-rear symmetrical) to each other except for opposing faces 51 thereof to be described later. The pair of auxiliary brackets 7 are also formed similarly (right-left symmetrical) to each other.

Each battery-side bracket 5 extends in the vehicle width direction D2. Each battery-side bracket 5 has an opposing face 51 facing one of the first side faces 42, 43 (front face 42 or rear face 43) of the battery pack 4, and a pair of extending faces 52 respectively extending from an upper edge and a lower edge of the opposing face 51 toward the battery pack 4. Specifically, the battery-side bracket 5 disposed on the front side of the battery pack 4 has the opposing face 51 facing the front face 42 of the battery pack 4 and the pair of extending faces 52 respectively extending rearward from the upper and lower edges of the opposing face 51. The battery-side bracket 5 disposed on the rear side of the battery pack 4 has the opposing face 51 facing the rear face 43 of the battery pack 4 and the pair of extending faces 52 respectively extending forward from the upper and lower edges of the opposing face 51.

The pair of extending faces 52 in each battery-side bracket 5 overlap the top and bottom faces of the battery pack 4, respectively. That is, the extending face 52 extending from the upper edge of the opposing face 51 is disposed above the battery pack 4, and the extending face 52 extending from the lower edge of the opposing face 51 is disposed below the battery pack 4.

Each auxiliary bracket 7 extends in the longitudinal direction D1. Each auxiliary bracket 7 has a web face 71 facing one of the second side faces 41 of the battery pack 4, and a pair of flange faces 72 respectively extending from upper and lower edges of the web face 71 toward the battery pack 4 (inward in the vehicle width direction D2). The pair of flange faces 72 of the auxiliary bracket 7 are arranged so as to overlap the pairs of extending faces 52 of the battery-side brackets 5, and are coupled to the extending faces 52 of the battery-side brackets 5 with non-illustrated fixtures.

As illustrated in FIG. 1, the frame-side brackets 6 connect the battery-side brackets 5 to the side rails 21. Each of the frame-side brackets 6 of the present embodiment is fixed to both the upper extending face 52 of the battery-side bracket 5 and the web portion of the side rail 21, and thereby, connects the battery-side bracket 5 to the side rail 21. Although the number of frame-side brackets 6 is not particularly limited, the present embodiment illustrates an example in which two frame-side brackets 6 are provided on each of the right and left sides of each battery pack 4 (four for each battery pack in total).

[1-2. Main Configuration]

Figure 3:
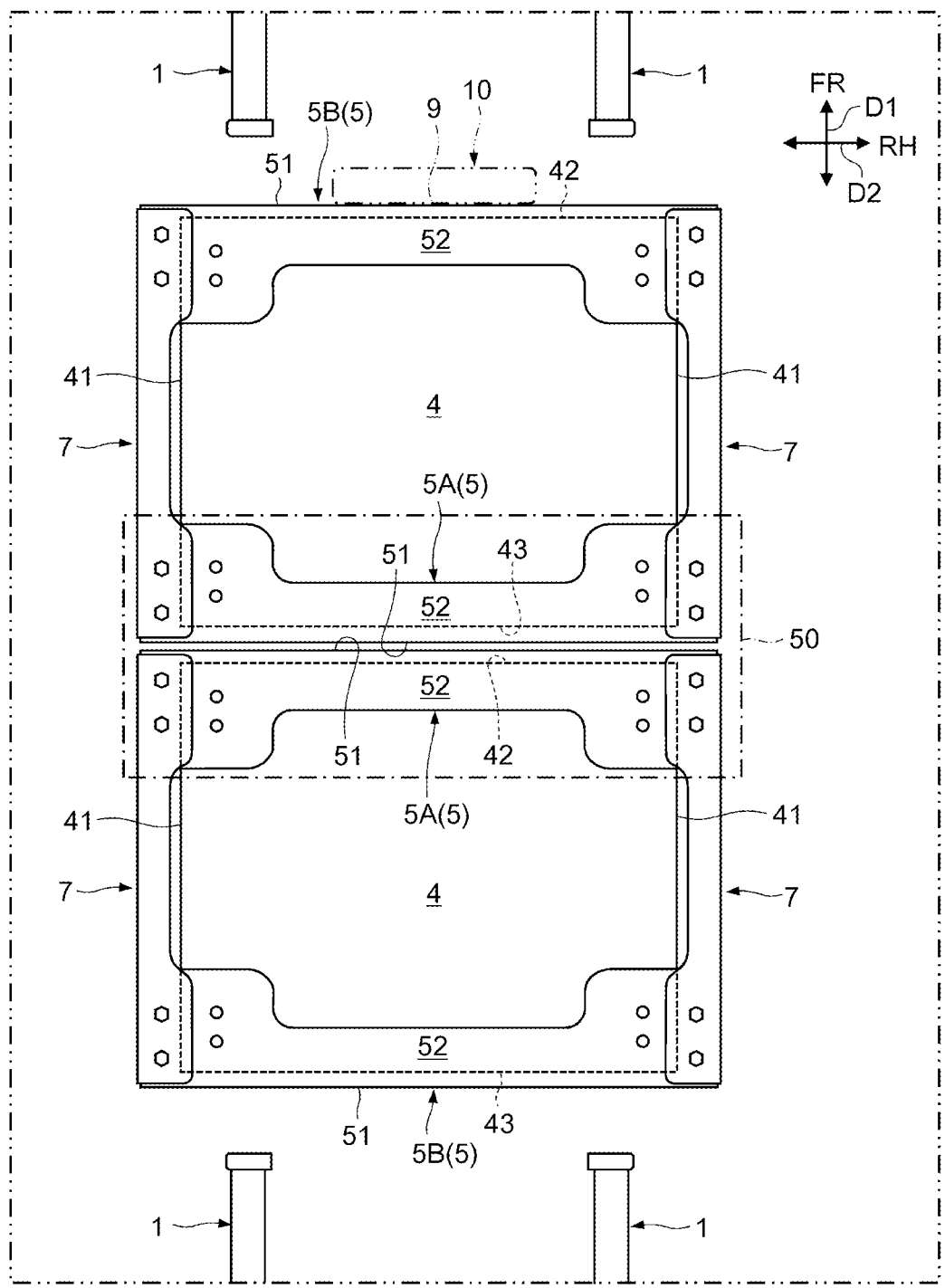
FIG. 3 is a diagram omitting a ladder frame and frame-side brackets from FIG. 1.

FIG. 3 is a diagram omitting the ladder frame 2 and the frame-side brackets 6 from FIG. 1. As illustrated in FIG. 3, the battery-side brackets 5 include two intermediate brackets 5A adjacent to each other in the vehicle length direction D1 and two outer brackets 5B disposed at outermost positions in the vehicle length direction D1. The number of intermediate brackets 5A included in the battery-side brackets 5 should not be limited to two. For example, in an electric truck in which three battery packs 4 are arranged adjacently in the vehicle length direction D1, two sets of two intermediate brackets 5A (four in total) adjacent to each other are provided between the adjacent battery packs 4.

The intermediate brackets 5A are the battery-side brackets 5 of which opposing faces 51 are disposed between the battery packs 4. Since each intermediate bracket 5A is adjacent to the other intermediate bracket 5A, the opposing face 51 thereof is not exposed.

On the other hand, the outer brackets 5B are the battery-side brackets 5 of which opposing faces 51 are disposed not between the battery packs 4, but in front of the frontmost battery pack 4 or behind the rearmost battery pack 4. Each outer bracket 5B is not adjacent to the other battery-side bracket 5, and the opposing face 51 thereof is exposed. In the electric truck 3 of the present embodiment, the leaf suspensions 1 are disposed so as to be adjacent to the outer brackets 5B in the vehicle length direction D1.

Figure 4:
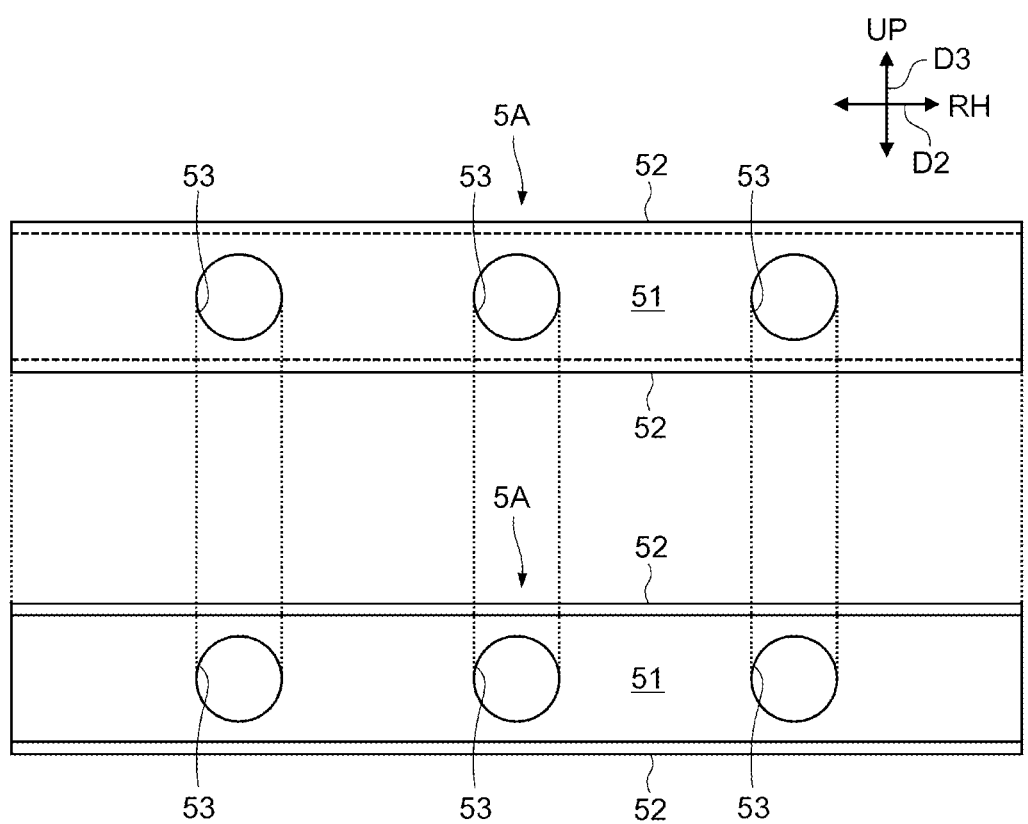
FIG. 4 is a rear view illustrating vertically separated two intermediate brackets.

As illustrated in FIG. 4, lightening holes 53 are formed on the opposing faces 51 of the intermediate brackets 5A. Here, three lightening holes 53 in circular shapes equal to each other are arranged at equal intervals in the vehicle width direction D2 on the opposing face 51 of each intermediate bracket 5A. However, the shapes, number, and arrangements of the lightening holes 53 should not be limited to those exemplified here.

The lightening holes 53 of the present embodiment are provided so as to avoid corner portions formed by the opposing face 51 and each of the extending faces 52 in each intermediate bracket 5A. In other words, the lightening holes 53 are provided in a central region in the vehicle height direction D3 of the opposing face 51 of each intermediate bracket 5A (the central region being the region excluding the upper and lower edges of the opposing face 51).

The intermediate brackets 5A of the present embodiment each have a bilaterally (right-left) symmetrical structure and are formed to be equal to each other. Further, the two intermediate brackets 5A are equal to each other in the arrangements of the lightening holes 53 when being in a state adjacent to each other. That is, in the two intermediate brackets 5A, the lightening holes 53 are arranged so as to be mirror-symmetrical to each other. As described above, in the present embodiment, the lightening holes 53 provided in the two intermediate brackets 5A entirely overlap each other when viewed in the vehicle length direction D1.

Figure 5:
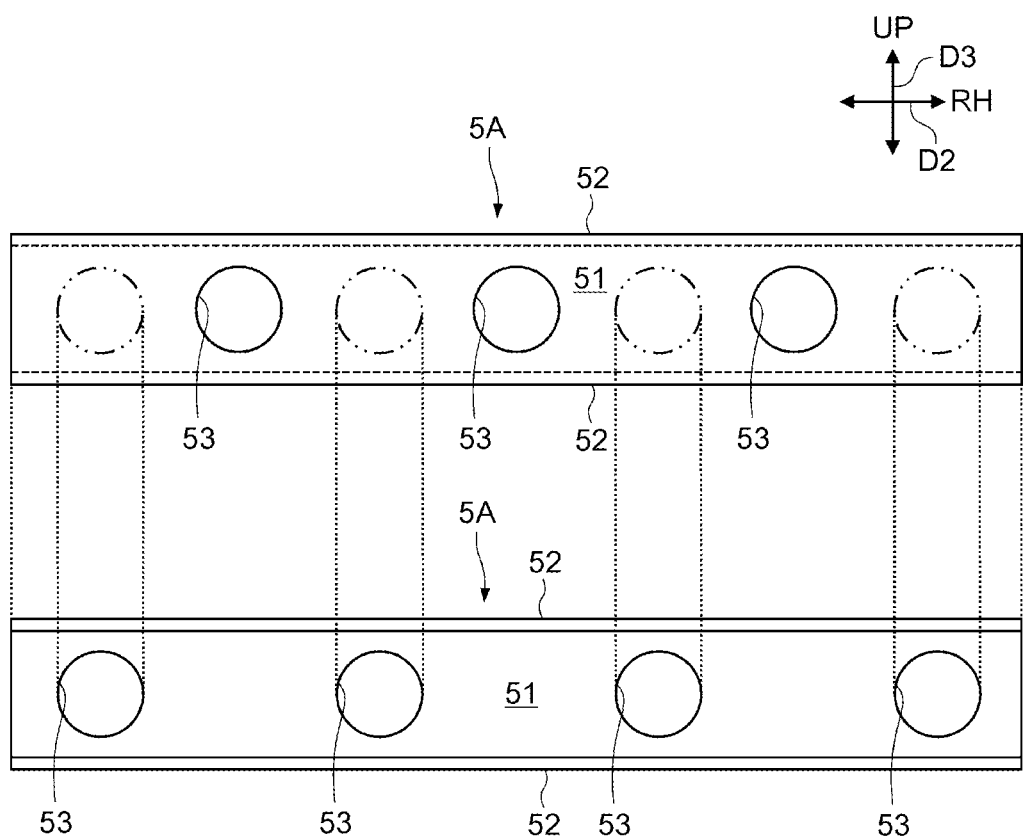
FIG. 5 is a rear view (corresponding to FIG. 4) illustrating vertically separated two intermediate brackets according to a modification.
Figure 6:
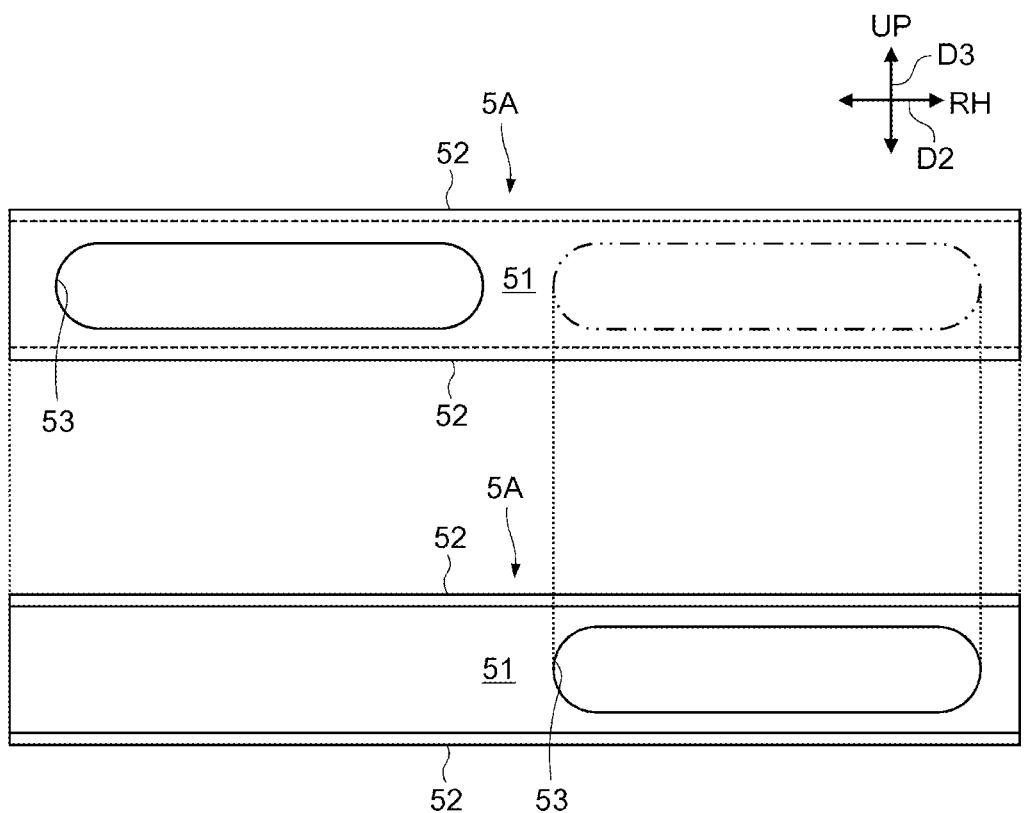
FIG. 6 is a rear view (corresponding to FIG. 4) illustrating vertically separated two intermediate brackets according to another modification.

In contrast, as illustrated in FIGS. 5 and 6, the two intermediate brackets 5A may be different from each other in the arrangements of the lightening holes 53. FIG. 5 illustrates an example of the arrangements in which multiple lightening holes 53 arranged at equal intervals in the vehicle width direction D2 are shifted from each other by half pitch (alternatively arranged) in the two intermediate brackets 5A, 5A. FIG. 6 illustrates another example of the arrangements in which a single lightening hole 53 is formed on each of the left half portion of one intermediate bracket 5A and the right half portion of the other intermediate bracket 5A. Incidentally, FIG. 5 illustrates the lightening holes 53 in circular shapes, and FIG. 6 illustrates the lightening holes 53 in oval shapes, but the shapes of the lightening holes 53 should not be limited to these examples.

As illustrated by two-dot chain lines in FIGS. 5 and 6, in the two intermediate brackets 5A according to modifications, the lightening holes 53 are not mirror-symmetrical to each other. This means that the lightening holes 53 provided in these two intermediate brackets 5A do not overlap each other (specifically, they are shifted from each other in the vehicle width direction D2) when viewed in the vehicle length direction D1.

Figure 7:
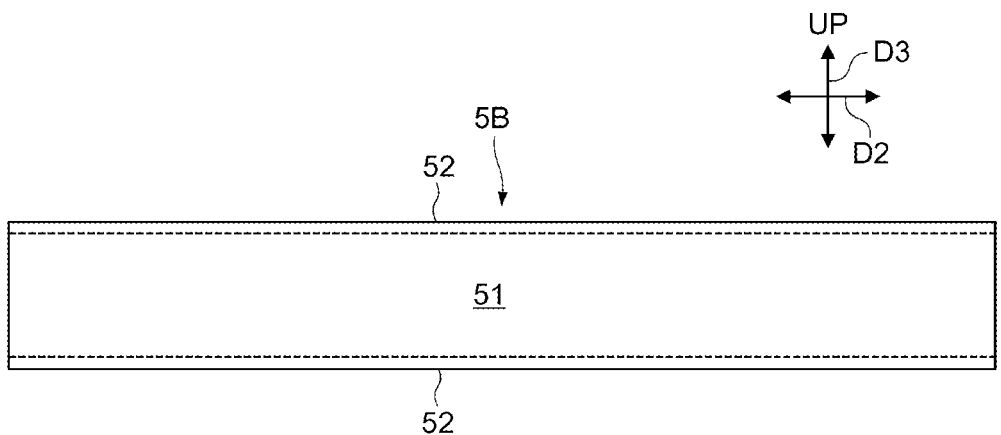
FIG. 7 is a front view (or a rear view) of an outer bracket.

In contrast to the intermediate brackets 5A having the lightening holes 53, as illustrated in FIG. 7, the outer brackets 5B do not have any lightening holes on the opposing faces 51 thereof. This ensures higher rigidity and strength of the opposing faces 51 of the outer brackets 5B as compared to the rigidity and strength of the opposing faces 51 of the intermediate brackets 5A. In other words, due to the presence of the lightening holes 53, each of the intermediate brackets 5A has lower rigidity and strength as compared to each of the outer brackets 5B not having any lightening holes.

Here, as illustrated in FIG. 3, the two intermediate brackets 5A adjacent to each other are regarded as an intermediate unit 50. In the present embodiment, the rigidity of the intermediate unit 50 and the rigidity of one outer bracket 5B are set to be equal to each other. Such setting of rigidities can be realized by, for example, appropriately adjusting materials, plate thicknesses, shapes, and the likes of the battery-side brackets 5 (intermediate brackets 5A and outer brackets 5B). The rigidity of the intermediate unit 50 can also be adjusted by modifying the shapes, number, arrangements, and the likes of the lightening holes 53 provided on the opposing faces 51.

Figure 8:
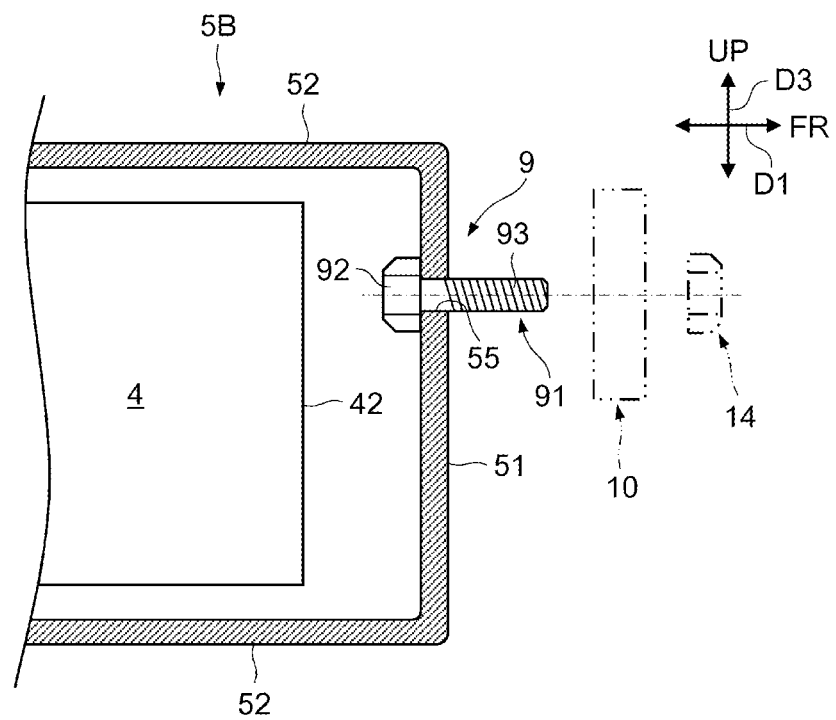
FIG. 8 is a schematic sectional view illustrating an example of a device mounting unit.
Figure 9:
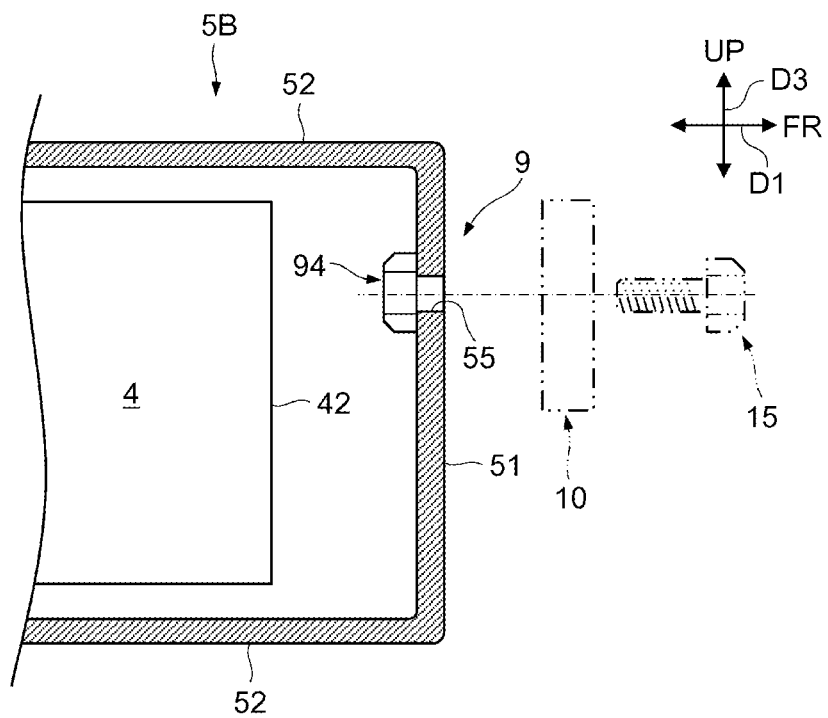
FIG. 9 is a schematic sectional view illustrating an example of a device mounting unit.

As illustrated by a two-dot chain line in FIG. 3, the outer bracket 5B may include a device mounting unit 9 that mounts an on-board device 10 on the opposing face 51 thereof. An example of the on-board device 10 to be mounted on the device mounting unit 9 is a power distribution device (PDU; Power Distribution Unit) that distributes electric power outputted from the battery packs 4 to multiple auxiliary devices. FIG. 3 and FIGS. 8, 9 to be described later each illustrate the device mounting unit 9 provided on the outer bracket 5B disposed on the front side of the front battery pack 4, but alternatively (or additionally), the device mounting unit 9 may be provided on the outer bracket 5B disposed on the rear side of the rear battery pack 4.

The device mounting unit 9 is a portion to which the on-board device 10 is attached and has a structure capable of mounting the on-board device 10. As illustrated in FIGS. 8 and 9, respectively, the device mounting unit 9 may include a welded bolt 91 and a welded nut 94 for attaching the on-board device 10 to the opposing face 51 of the outer bracket 5B.

As illustrated in FIG. 8, the welded bolt 91 has a head portion 92 welded to an inner side (the side of the battery pack 4) of the opposing face 51 and a threaded portion 93 protruding from the head portion 92 to an outer side (the side departing away from the battery pack 4) of the opposing face 51. Specifically, the welded bolt 91 is fixed to the inner side of the opposing face 51 under a state in which the threaded portion 93 thereof is inserted from the side of the battery pack 4 through a hole portion 55 formed through the opposing face 51 of the outer bracket 5B.

The threaded portion 93 of the welded bolt 91 is inserted through a through-hole (not illustrated) formed in the on-board device 10 (or its bracket or the like), and then, is fastened to a nut 14. Thereby, the on-board device 10 is attached to the device mounting unit 9 including the welded bolt 91.

As illustrated in FIG. 9, the welded nut 94 is welded to the inner side of the opposing face 51. Specifically, the welded nut 94 is fixed to the inner side of the opposing face 51 while being arranged coaxially with the hole portion 55.

The welded nut 94 is fastened to a bolt 15 penetrating from the outer side to the through-hole (not illustrated) formed in the on-board device 10 (or its bracket or the like). Thereby, the on-board device 10 is attached to the device mounting unit 9 including the welded nut 94.

The method for mounting the on-board device 10 on the device mounting unit 9 should not be limited to those using the above-described welded bolt 91 or the welded nut 94, and alternatively, various known methods can be applied. For example, the on-board device 10 may be mounted on the device mounting unit 9 by using a normal bolt or nut (not illustrated) not welded to the opposing face 51. Further alternatively, the on-board device 10 may be directly welded to the device mounting unit 9.

2. Actions and Effects (1) According to the battery-side brackets 5 disposed on both sides in the vehicle length direction D1 of each battery pack 4, in the event of a side collision of the electric truck 3, a side collision load can be transmitted from the collision side to the opposite side in the vehicle width direction D2. Thus, the side collision load is absorbed by not only the members on the collision side (e.g., the side rail 21, the frame-side brackets 6, and the auxiliary bracket 7 on either right or left side), but also the members on the side opposite to the collision side, so that the protectability of the battery pack 4 in side collisions can be enhanced.

It should be noted that, in the battery-side brackets 5, the side collision load is transmitted mainly through portions having a relatively high rigidity. To be more specific, the side collision load is transmitted in the vehicle width direction D2 mainly through the corner portions between the opposing faces 51 and the extending faces 52. Hence, the central regions in the vehicle height direction D3 of the opposing faces 51 of the battery-side brackets 5 do not contribute much to the transmission of the side collision load. In addition to this, among the battery-side brackets 5, the intermediate brackets 5A adjacent to each other do not easily come into contact with other members (the members other than the intermediate brackets 5A) even in the event of collisions of the electric truck 3 since the opposing faces 51 thereof are not exposed. Therefore, as compared with the outer brackets 5B of which opposing faces 51 are exposed, the intermediate brackets 5A do not require a high load bearing strength.

In view of this, by providing the lightening holes 53 on the opposing faces 51 of the intermediate brackets 5A, the weight of the intermediate brackets 5A can be reduced while the requirement of the load bearing strength is satisfied and the function of transmitting the side collision load is ensured as described above. In contrast, by not providing any lightening holes on the opposing faces 51 of the outer brackets 5B, the load bearing strength of the outer brackets 5B is ensured, so that even if the outer brackets 5B come into contact with other members in a front or rear collision of the electric truck 3, negative effects on the battery packs 4 can be reduced. Therefore, according to the electric truck 3, it is possible to suppress the weight increase while ensuring the protectability of the battery packs 4 in collisions (side collisions, front collisions, and rear collisions).

Incidentally, if the rigidity of each battery-side bracket 5 (intermediate bracket 5A and outer bracket 5B) is equal, the rigidity of the intermediate unit 50 consisting of two adjacent intermediate brackets 5A becomes higher than the rigidity of one outer bracket 5B not adjacent to the other battery-side brackets 5. This will cause a rigidity imbalance between the region where the intermediate unit 50 is provided and the region where a single outer bracket 5B is provided, and may also cause disparities in the function of transmitting the side collision load.

In contrast, according to the electric truck 3, the individual intermediate bracket 5A is formed to have a rigidity lower than the rigidity of the individual outer bracket 5B due to the lightening holes 53, so that the rigidity imbalance described above can be suppressed. This reliably ensures the function of transmitting the side collision load in both regions where the intermediate unit 50 is provided and where the outer bracket 5B is provided. Therefore, the protectability of the battery packs 4 in side collisions can be more reliably ensured.

Further, in the electric truck 3, since the second side faces 41 of the battery packs 4 are positioned outside in the vehicle width direction D2 of the side rails 21, the capacities of the battery packs 4 can be increased. On the other hand, in the event of a side collision, the side collision load may be input to the second side faces 41 of the battery packs 4 before being input to the side rails 21, which means that it is desired to enhance the protectability of the battery packs 4. With regard to this, according to the battery-side brackets 5, since the function of transmitting the side collision load is ensured and the requirement of the load bearing strength is satisfied as described above, the protectability of the battery packs 4 in side collisions can be ensured while the battery packs 4 can have increased capacities.

(2) According to the outer bracket 5B having the device mounting unit 9, since the on-board device 10 is mounted on the opposing face 51 of the outer bracket 5B, the mountability of the on-board device 10 can be enhanced. Further, in a front or rear collision of the electric truck 3, since the impact load is inputted to the on-board device 10 before being input to the outer bracket 5B, the initial input of the impact load can be absorbed by the on-board device 10 before being absorbed by the outer bracket 5B. As a result, the impact load to be transmitted to the outer bracket 5B can be reduced, so that the impact load to be transmitted to the battery packs 4 through the outer bracket 5B can also be reduced. Therefore, the protectability of the battery packs 4 in front or rear collisions can be enhanced.

(3) If the on-board device 10 mounted on the device mounting unit 9 is the power distribution device that distributes the electric power outputted from the battery packs 4 to the multiple auxiliary devices, the power distribution device, which is a device associated with the battery packs 4, can be mounted on the outer bracket 5B near to the battery packs 4. Thus, the routing performance of harness that connects, for example, the battery packs 4 and the power distribution device can be enhanced. In addition, when the battery packs 4 supported by the battery-side brackets 5 are detached from the side rails 21, the power distribution device can be moved together (integrally) with the battery-side brackets 5 and the battery packs 4. Therefore, the mountability and the dismountability of the power distribution device can be enhanced.

(4) According to the intermediate bracket 5A having the lightening hole 53 in the central region in the vehicle height direction D3 of the opposing face 51, it is possible to prevent a decrease in rigidity of the corner portions between the opposing face 51 and each of the extending faces 52. This ensures the function of transmitting the side collision load in the intermediate bracket 5A more appropriately. Therefore, it is possible to achieve more reliable assurance of the protectability of the battery packs 4 in side collisions.

(5) If the arrangements of the lightening holes 53 in the two intermediate brackets 5A adjacent to each other are equal to each other, a common member can be applied as each of these intermediate brackets 5A. This contributes to a cost reduction. Further, since the rigidity becomes equal between the two intermediate brackets 5A adjacent to each other, equalization of the rigidity can be realized.

(6) In contrast, if the arrangements of the lightening holes 53 in the two intermediate brackets 5A adjacent to each other are different from each other, a portion at which the lightening hole 53 is formed in one intermediate bracket 5A can be strengthened by a portion at which the lightening hole 53 is not formed in the other intermediate bracket 5B. Thus, the rigidity is more likely to be ensured at any positions in the intermediate unit 50 in which the two intermediate brackets 5A are regarded as a single complex, so that local deformations in each of the intermediate brackets 5A can be suppressed even in collisions of the electric truck 3. Further, while ensuring the rigidity in the entire area of the intermediate unit 50 as described above, the cut amount of the lightening holes 53 can be increased (the lightening hole 53 can be enlarged in each of the intermediate brackets 5A), so that a further weight reduction can be achieved in the intermediate brackets 5A.

(7) In the electric truck 3 including the leaf suspension 1 disposed adjacently in the vehicle length direction D1 to the outer bracket 5B, the leaf suspension 1 and the outer bracket 5B may come into contact with each other in the event of a front or rear collision. In regard to this, according to the outer brackets 5B without the lightening holes on the opposing faces 51 as described above, since the load bearing strength is ensured, negative effects on the battery packs 4 can be reduced even in the case where the outer brackets 5B come into contact with the leaf suspensions 1, which are heavy objects. Therefore, it is possible to ensure the protectability of the battery packs 4 in front or rear collisions.

3. Modifications

The above-described configuration of the electric truck 3 is merely an example. The electric truck 3 may be equipped with three or more battery packs 4 adjacently arranged along the vehicle length direction D1. In such a configuration also, by providing the lightening holes 53 on the opposing faces 51 of the intermediate brackets 5A adjacent to each other in the vehicle length direction D1, and by not providing any lightening holes on the opposing faces 51 of the outer brackets 5B disposed at the outermost positions in the vehicle length direction D1, it is possible to suppress the weight increase while ensuring the protectability of the battery packs 4 in the event of collisions as in the above embodiment.

The configurations, arrangements, and number of the frame-side brackets 6 should not be limited to the above examples. The auxiliary brackets 7 may be omitted.

The specific structure of the device mounting unit 9 should not be limited to the above-described examples, either. The device mounting unit 9 may include both the welded bolt 91 and the welded nut 94, or may include structures other than the welded bolt 91 or the welded nut 94. Further, the on-board device 10 to be mounted on the device mounting unit 9 should not be limited to the power distribution device described above, and may alternatively be various devices to be mounted on the electric truck 3.

The leaf suspensions 1 may be omitted. According to the outer brackets 5B described above, since the lightening holes are not provided on the opposing faces 51 thereof and the load bearing strength is ensured, the negative effects on the battery packs 4 can be reduced even in a case where the outer brackets 5B come into contact with members other than the leaf suspensions 1 in a front or rear collision.

REFERENCE SIGNS LIST 1 leaf suspension
2 ladder frame
3 electric truck
4 battery pack
5 battery-side bracket
5A intermediate bracket
5B outer bracket
6 frame-side bracket
7 auxiliary bracket
9 device mounting unit
10 on-board device
14 nut
15 bolt
21 side rail
22 cross member
41 second side face
42 front face (first side face)
43 rear face (first side face)
50 intermediate unit
51 opposing face
52 extending face
53 lightening hole
55 hole portion
71 web face
72 flange face
91 welded bolt
92 head portion
93 threaded portion
94 welded nut
D1 vehicle length direction
D2 vehicle width direction
D3 vehicle height direction

The invention claimed is:

1. An electric truck provided with a plurality of battery packs adjacently arranged along a vehicle length direction, the battery packs each being installed under side rails constituting a ladder frame, the battery packs each having: a pair of first side faces facing to the vehicle length direction; and a pair of second side faces facing to a vehicle width direction, the electric truck comprising:
   battery-side brackets disposed on both sides in the vehicle length direction of each of the battery packs, the battery-side brackets each having an opposing face facing one of the first side faces and a pair of extending faces respectively extending from an upper edge and a lower edge of the opposing face and respectively overlapping a top face and a bottom face of the battery pack; and
   frame-side brackets connecting the battery-side brackets to the side rails, wherein among the battery-side brackets, intermediate brackets adjacent to each other in the vehicle length direction each have at least one lightening hole on the opposing face thereof, and outer brackets disposed at outermost positions in the vehicle length direction do not have any lightening holes.

2. The electric truck according to claim 1, wherein the outer bracket has a device mounting unit that mounts an on-board device on the opposing face thereof.

3. The electric truck according to claim 2, wherein the on-board device is a power distribution device that distributes electric power outputted from the battery packs to a plurality of auxiliary devices.

4. The electric truck according to claim 1, wherein the intermediate bracket has the lightening hole in a central region in a vehicle height direction of the opposing face thereof.

5. The electric truck according to claim 1, wherein two of the intermediate brackets adjacent to each other are equal to each other in arrangements of the lightening holes.

6. The electric truck according to claim 1, wherein two of the intermediate brackets adjacent to each other are different from each other in arrangements of the lightening holes.

7. The electric truck according to claim 1, further comprising
a leaf suspension disposed adjacently in the vehicle length direction to the outer bracket.

8. The electric truck according to claim 1, wherein:
the pair of second side faces are positioned outside in the vehicle width direction of the side rails.

\* \* \* \* \*